US011668172B2

(12) United States Patent
Bobadilla Larios et al.

(10) Patent No.: US 11,668,172 B2
(45) Date of Patent: Jun. 6, 2023

(54) REMOTE MANIFOLD VALVE AND PUMP PAIRING TECHNIQUE FOR A MULTI-PUMP SYSTEM

(71) Applicant: SCHLUMBERGER TECHNOLOGY CORPORATION, Sugar Land, TX (US)

(72) Inventors: Manuel Alfonso Bobadilla Larios, Stafford, TX (US); Nan Mu, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 113 days.

(21) Appl. No.: 15/746,541

(22) PCT Filed: Jul. 21, 2016

(86) PCT No.: PCT/US2016/043217
§ 371 (c)(1),
(2) Date: Jan. 22, 2018

(87) PCT Pub. No.: WO2017/015411
PCT Pub. Date: Jan. 26, 2017

(65) Prior Publication Data
US 2018/0209257 A1 Jul. 26, 2018

Related U.S. Application Data

(60) Provisional application No. 62/195,104, filed on Jul. 21, 2015.

(51) Int. Cl.
*E21B 43/26* (2006.01)
*F17D 5/02* (2006.01)
(Continued)

(52) U.S. Cl.
CPC ............ *E21B 43/2607* (2020.05); *F17D 5/02* (2013.01); *G05D 7/0688* (2013.01); *E21B 43/267* (2013.01)

(58) Field of Classification Search
CPC ........ E21B 43/26; E21B 43/267; E21B 43/16; E21B 43/25; E21B 33/03; F17D 5/02; G05D 7/0688
See application file for complete search history.

(56) References Cited

U.S. PATENT DOCUMENTS

| | | |
|---|---|---|
| 4,821,564 A | 4/1989 | Pearson et al. |
| 2004/0140092 A1 | 7/2004 | Robison |

(Continued)

FOREIGN PATENT DOCUMENTS

| | | |
|---|---|---|
| WO | 2013133874 A1 | 9/2013 |
| WO | 2014158806 A1 | 10/2014 |

OTHER PUBLICATIONS

International Search Report and Written Opinion issued in International Patent Appl. No. PCT/US2016/043217 dated Nov. 3, 2016; 14 pages.

(Continued)

*Primary Examiner* — Christopher J Sebesta
(74) *Attorney, Agent, or Firm* — Jeffrey D. Frantz

(57) ABSTRACT

A technique for remote pairing of pumps and manifold valves at an oilfield. The technique takes advantage of a control unit having remote capability of opening and closing manifold valves. The control unit may also be in simultaneous communication with an individual sensor for each pump. Thus, unique protocols of valve opening and closing at the manifold in conjunction with monitoring of fluid-based detections by the unit may be used to establish pairing between specific pumps and manifold valves. Similarly, the system may also be inspected for leaks at particular loca- (Continued)

tions through unique valve opening and closing sequences in conjunction with fluid monitoring.

16 Claims, 6 Drawing Sheets

(51) Int. Cl.
  *G05D 7/06* (2006.01)
  *E21B 43/267* (2006.01)

(56) References Cited

U.S. PATENT DOCUMENTS

| | | | |
|---|---|---|---|
| 2007/0277982 A1* | 12/2007 | Shampine | E21B 43/16 |
| | | | 166/308.1 |
| 2009/0120635 A1* | 5/2009 | Neal | E21B 21/003 |
| | | | 166/250.15 |
| 2009/0194273 A1* | 8/2009 | Surjaatmadja | E21B 43/26 |
| | | | 166/250.1 |
| 2009/0222180 A1 | 9/2009 | Kraenzlein et al. | |
| 2011/0030963 A1 | 2/2011 | Demong et al. | |
| 2011/0252895 A1 | 10/2011 | Kiesbauer et al. | |
| 2012/0235829 A1* | 9/2012 | Adnan | E21B 41/00 |
| | | | 340/854.9 |
| 2013/0233560 A1* | 9/2013 | Davidson | E21B 43/26 |
| | | | 166/308.1 |
| 2013/0284455 A1* | 10/2013 | Kajaria | F16L 23/08 |
| | | | 166/379 |
| 2014/0069651 A1 | 3/2014 | Shampine et al. | |
| 2014/0090475 A1 | 4/2014 | Sherman et al. | |
| 2014/0238498 A1 | 8/2014 | Ding et al. | |
| 2014/0277772 A1 | 9/2014 | Lopez et al. | |
| 2014/0290768 A1 | 10/2014 | Randle et al. | |
| 2015/0149100 A1 | 5/2015 | Eisenbeis et al. | |
| 2015/0153314 A1 | 6/2015 | Karoum et al. | |
| 2016/0319648 A1* | 11/2016 | Hayworth | E21B 43/267 |
| 2017/0285668 A1 | 10/2017 | Moseley et al. | |
| 2018/0095455 A1 | 4/2018 | Silva et al. | |
| 2018/0096277 A1 | 4/2018 | Maidla et al. | |
| 2018/0112795 A1 | 4/2018 | Anderson | |

OTHER PUBLICATIONS

International Search Report and Written Opinion issued in International Patent Appl. No. PCT/US2016/021336 dated Jun. 2, 2016; 18 pages.
Exam Report issued in Canadian Patent Application No. 2978910 dated Jun. 7, 2022, 5 pages.

* cited by examiner

REMOTE MANIFOLD VALVE AND PUMP PAIRING TECHNIQUE FOR A MULTI-PUMP SYSTEM

CROSS-REFERENCE

The present document is based on and claims priority to U.S. Provisional Application Ser. No. 62/195,104, filed Jul. 21, 2015, which is incorporated herein by reference in its entirety.

BACKGROUND

Exploring, drilling and completing hydrocarbon and other wells are generally complicated, time consuming and ultimately very expensive endeavors. As a result, oilfield efforts are often largely focused on techniques for maximizing recovery from each and every well. Whether the focus is on drilling, unique architecture, or step by step interventions directed at well fracturing, the techniques have become quite developed over the years. One such operation at the well site directed at enhancing hydrocarbon recovery from the well is referred to as a stimulation application. Generally, in conjunction with fracturing, a stimulation application is one in which a large amount of proppant, often a type of sand, is directed downhole at high pressure along with large volumes of water. So, for example, downhole well perforations into a formation adjacent the well which have been formed by fracturing may be further opened and/or reinforced for sake of recovery therefrom.

For effectiveness, the slurry of proppant and water that is utilized during stimulation is often supplied downhole at considerable rates and pressures. For example, it would not be uncommon for the slurry to be pumped at more than 60-1000 barrels per minute (BPM) at pressures exceeding 10,000 PSI. Thus, in order to ensure that a sufficient volume, rate and pressure of the slurry is delivered during the stimulation application, a host of positive displacement pumps are often positioned at the oilfield for sake of driving the stimulation application. Specifically, each one of several pumps may be fluidly linked to a manifold which coordinates the overall delivery of the slurry fluid downhole.

The manifold, often referred to as a "missile", may be directly fluidly linked to each pump as well as mixer from which the slurry is obtained. In this manner, the manifold may distribute the slurry to each pump from the mixer and then receive the slurry back from each pump at greater pressures for directing downhole for stimulation.

As a practical matter, the overall fluid linking between the manifold and each individual pump may become a bit complex. For example, the manifold will often include ten different stations at which different valves are located for the linking. More specifically, each station generally includes a high pressure intake valve for regulating the receipt of the high pressure fluid slurry from a given pump. Once more, the same station also includes at least one low pressure outflow valve for regulating the delivery of the slurry from the mixer to the corresponding pump in the first place. In fact, it is most likely that each station will include multiple low pressure outflow valves of this type. Thus, the volume of slurry out of the manifold may be increased even though the outflow rate may be comparatively lower than that being supplied back to the manifold from the pumps. Additionally, the extra low pressure outflow valve also allows for some added flexibility. For example, in larger operations, one manifold may be linked to another via tubing running between outflow valves of adjacent manifolds.

Regardless the particular system setup, the end result is that a complex web of tubing generally ends up running between a variety of different pumps at the oilfield and one or more centrally located manifolds. From an operator or personnel perspective, the result is a large worksite that includes a hazardous central high pressure manifold area with multitudes of tubing running in various directions to and from up to ten high pressure pumps or more.

This environment is particularly challenging for on-site personnel when, over the course of natural operations, there becomes the need to turn a valve at the manifold on or off, for example, to take a pump off-line for repair or for any other reason. For example, in a conventional system, shutting off any valve requires that personnel manually access the valve within the hazardous high pressure zone around the manifold. Furthermore, as noted, a morass of tubing may be found running to and from the manifold to various pumps. Thus, properly identifying and reaching the appropriate station and valve location on the manifold for a given pump may be a challenge in and of itself. This may be particularly true over time where different pumps have been brought on and off line over the course of natural operations. Ultimately, the scene around the manifold may look more like the back of an old home stereo system than an organized worksite of readily traceable tubings between pumps and manifold station locations.

Over the years, efforts have been undertaken to reduce the complexity and improve safety for the personnel which may need to access the valves at the manifold as described. For example, in addition to enhanced focus on labeling and tracing of different tubing between each pump and station location at the manifold, some systems now include a pneumatically controlled manifold that allows the valves to be remotely open or closed. Thus, personnel need not directly interface with each valve right at the hazardous location of the manifold.

Unfortunately, however, remotely turning manifold valves on or off does not fully address the matter. Specifically, there remains the complexity associated with turning the correct valve on or off. For example, where a pump is to be taken off line but an improper, non-corresponding, high pressure valve at the manifold is misidentified for turning off, the result may be catastrophic. That is, this mis-pairing could result in the pump actually linked to the valve continuing to pump at very high pressures against a now closed valve. A potentially resulting blowout would likely be hazardous beyond the immediate vicinity of the manifold and certainly result in substantial equipment damage and a costly shutdown of operations.

SUMMARY

A method of remotely pairing high and low pressure valves at a manifold with individual pumps of a multi-pump system at an oilfield. The method includes opening all high pressure valves of the manifold and then sequentially opening low pressure valves at the manifold, one-by-one. Thus, as a responsive fluid-based detection, such as fluid flow, presents in a pump of the multi-pump system, it may be recorded as identifying a pairing between that pump and the correspondingly opened low pressure valve. Once the low pressure valves and pumps are paired, the valves may again be closed and this same type of fluid-based detection sequence applied to high pressure valves one-by-one at the manifold in relation to the individual pumps.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain embodiments of stimulation operations at an oilfield. Specifically, pumps, a manifold and other equipment are referenced for taking advantage of pairing techniques for performing stimulation applications. However, other types of operations may benefit from the embodiments of pairing techniques detailed herein. For example, such techniques may be employed for supporting fracturing or other related downhole operations supported by multiple high pressure pumps. Indeed, so long as pairing techniques are utilized which allow for both manually remote and substantially assured pairing between valve locations at the manifold and specific pumps, appreciable benefit may be realized.

Figure 1:
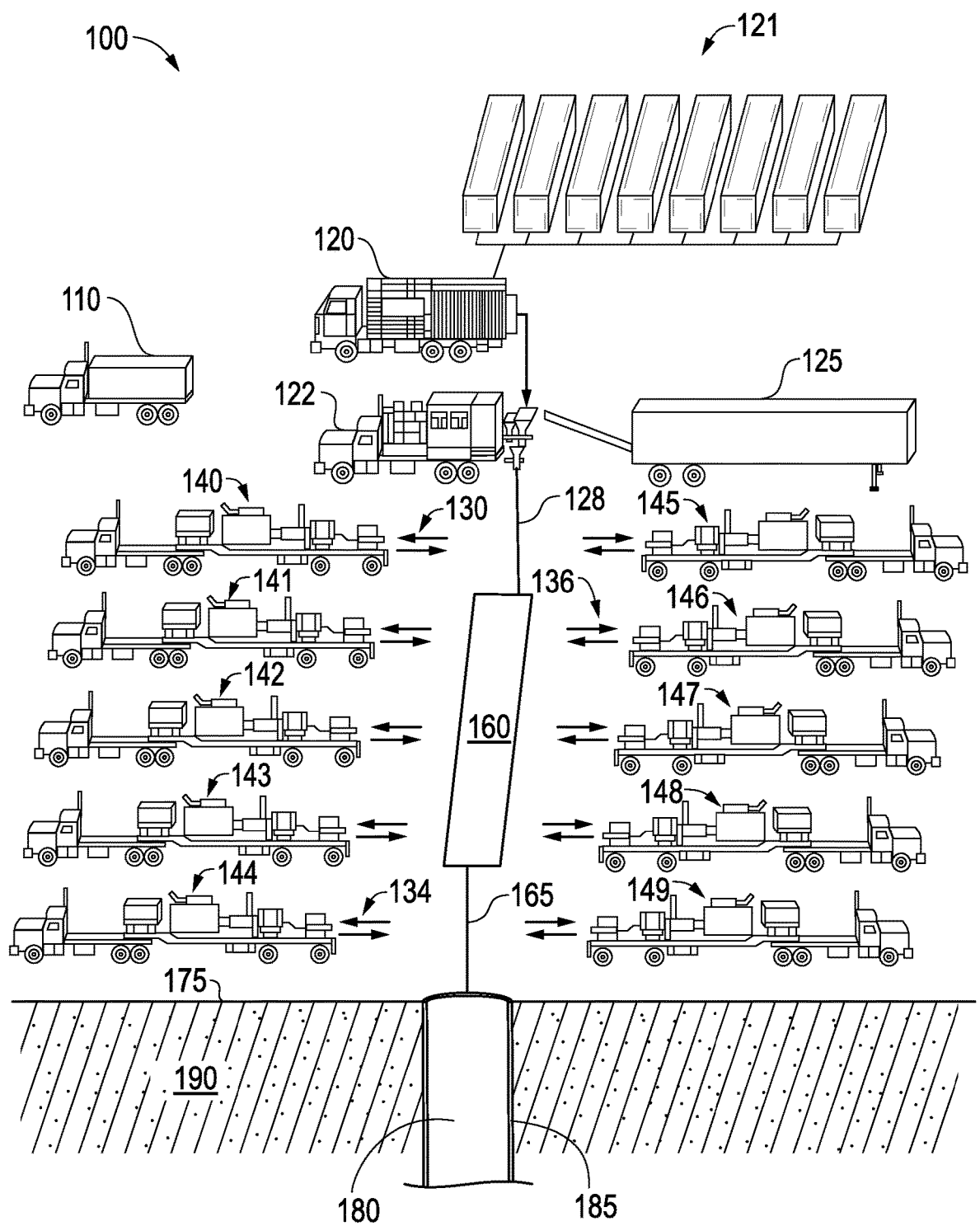
FIG. 1 is a schematic overview depiction of stimulation system at an oilfield employing an embodiment of a pairing technique for pumps and a manifold thereof.

Referring now to FIG. 1, a schematic overview depiction of stimulation system 100 is shown at an oilfield 175. As described further herein, the system 100 employs an embodiment of a pairing technique for a plurality of different pumps 140-149 and a manifold 160. That is, each pump 140-149 may be independently hooked up to the manifold 160 in a hydraulic fashion. More specifically, with added reference to FIG. 2, the manifold 160 may be outfitted with a plurality of different stations 230-234, whereat hydraulic lines running to and from each pump 140-149 may be secured. Thus, "pairing" or identifying which pump 140-149 is hydraulically coupled to which station 230-234 may be of substantial benefit, for example when a pump 140-149 is to be disconnected from the system 100. That is, in this example, proper pairing would allow for closure of the appropriate valve at the appropriate station 230-234 to maintain integrity of the system 100 while the corresponding pump 140-149 is taken off line. As depicted, the pumps 140-149 are each part of a mobile pump truck unit. Thus, once properly disconnected, a pump 140-149 may be driven away and perhaps replaced by another such mobile pump if necessary.

As indicated, the embodiment of FIG. 1 illustrates a typical layout for a stimulation or hydraulic fracturing system 100 at an oilfield 175. Apart from the unique pairing techniques referenced above and detailed further below, the system 100 includes common equipment for such operations. Specifically, a mixer 122 is provided that supplies a low pressure slurry to the manifold 160 for eventual use in a stimulation application in the well 180. In the embodiment shown, the well 180 is outfitted with casing 185 and may have been previously perforated and now ripe for stimulation. Regardless, the slurry is initially provided to the manifold 160 over a line 128 at comparatively low pressure, generally below about 100 PSI. However, for sake of the application, the slurry will be pressurized by the pumps 140-149 before being returned to the manifold 160 at high pressure, for the application. Specifically, pressures of between about 7,500 PSI and 15,000 PSI or more may be seen at the line 165 running to the well 180 for the stimulation application.

The mixer 122 is used to combine separate slurry components. Specifically, water from tanks 121 is combined with proppant from a proppant truck 125. The proppant may be sand of particular size and other specified characteristics for the application. Additionally, other material additives may be combined with the slurry such as gel materials from a gel tank 120. From an operators perspective, this mixing, as well as operation of the pumps 140-149, manifold 160 and other system equipment may be regulated from a control unit 110 having suitable processing and electronic control over such equipment. Indeed, as detailed further below, the control unit 110 may be outfitted with a capacity for remotely opening and closing the valves of the manifold 160 as needed, for example, when putting a pump 140-149 on or off-line.

Continuing with reference to FIG. 1, for a variety of reasons, the physical hydraulic linkages 130-139 between the pumps 140-149 and the manifold 160 may be a bit of a complex web. For example, the hydraulic hookup between each pump 140-149 and the manifold 160 involves separate lines running to each pump 140-149 from the manifold 160 as well as lines running from each pump 140-149 and back to the manifold 160. This is because, as noted above, low pressure "slurry" fluid that is supplied to the manifold 160 from the mixer 122 is initially routed to the pumps 140-149 for pressurization. The slurry is then routed back to the manifold 160 under much greater pressures for delivery to the well 180 as part of the noted stimulation application. Once more, as described below, the low pressure slurry that is provided to each pump 140-149 may generally be routed from more than one low pressure location at each given station 230-234 (e.g. see 260, 270 of FIG. 2). In fact, with further added reference to FIG. 2, there is generally no particular requirement that a given pump 140-149 utilize the same station 230-234 for both its low pressure and high pressure hydraulic hookups.

Continuing with reference to FIG. 1, for ease of illustration, the physical hydraulic linkages between the pumps 140-149 and the manifold 160 are depicted as sets of arrows 130-139 running toward and away from each pump. Specifically, an arrow running toward a given pump 140-149 represents a low pressure hookup for slurry in need of pressurization. Alternatively, an arrow running away from this pump 140-149 represents a high pressure hookup for slurry ready to be delivered to the well 180 from the manifold 160. However, while these physical hydraulic linkages 130-139 are depicted in a simplified manner for sake of illustration at FIG. 1, the reality is that these linkages 130-139 may constitute a complex web of lines running about the oilfield 175 as noted above. As a result, even setting aside potential safety issues, the ability to manually trace lines from each pump 140-149 to specific manifold locations may not be practical, particularly in terms of the amount of time that might be required. Thus, the reliable pairing techniques detailed herein may be of substantial benefit.

Pairing a given pump 140-149 with a particular high or low pressure manifold location may take less than about 5 minutes through the techniques detailed herein. As detailed further below, this is due to real-time pressure and/or flow information regarding each individual pump 140-149 being made available to the control unit 110 in combination with remote control over valves at the manifold 160. This allows for unique sequences of valve control to be exercised in combination with operating individual pumps 140-149 in order to remotely garner pairing information. Indeed, as also detailed below, specific sequencing of valve control may also be utilized for sake of leak detection in advance of pairing determinations.

Figure 2:
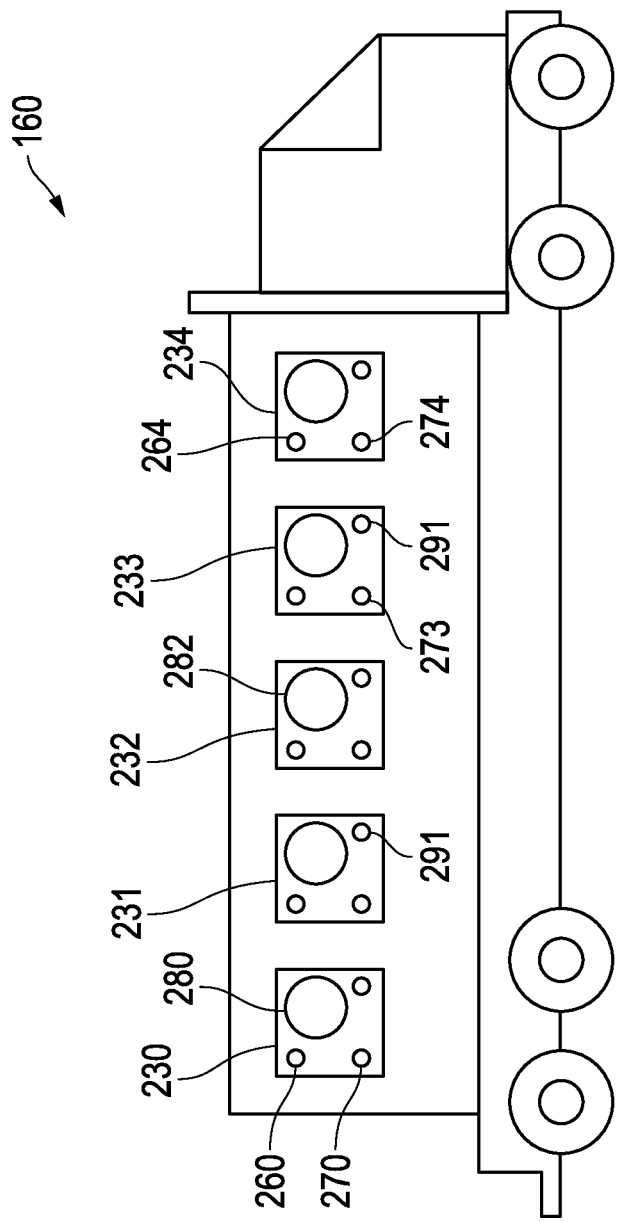
FIG. 2 is a side view of the manifold of FIG. 1 with stations accommodating valve locations for pairing with the pumps of FIG. 1.

Referring now to FIG. 2, a side view of the manifold 160 of FIG. 1 is shown. From this vantage point, five stations 230-234, of the ten total, are visible with the other five being at the opposite side of the manifold 160 (e.g. see FIG. 5). Ideally, the rear station 230 would align with the first pump 140 and linkages 130 at the oilfield 175 of FIG. 1. Similarly, the fifth, foremost station 234 would align with the fifth pump 144 and linkages 134 as shown at the oilfield 175. However, as detailed above, this is not always the case. Thus, a unique remote pairing technique may be undertaken to ascertain exactly which stations 230-234 and valve locations 260-264, 270-274, 280-284 are truly linked to which pumps 140-149. This pairing information may be stored at the control unit 110 and called upon as needed, for example, as pumps 140-149 are removed or added to the system 100.

Apart from bleed-off devices 290-294 and other features, as alluded to above, each station 230-234 may include a few different valve locations 260-264, 270-274, 280-284 for hydraulic communication with the pumps 140-149 of FIG. 1. Specifically, each station 230-234 includes a high pressure valve location 280-284. These locations directly couple a high pressure valve of the manifold 160 with the pressurized slurry from a pump 140-149 at the oilfield 175 of FIG. 1. Thus, the manifold 160 may be filled with pressurized slurry for a stimulation application as described above. However, in the embodiment shown, each station 230-234 is also outfitted with multiple low pressure valve locations 260-264 and 270-274. Each of these valve locations are equipped to couple a low pressure valve of the manifold 160 with a pump 140-149 to supply low pressure slurry thereto.

By convention, the low pressure valve locations 270-274 at the bottom portion of the stations 230-234 are more likely to be utilized. However, this is not required. For example, upper low pressure valve locations 260-264 may be utilized when a bottom valve location 270-274 is defective, occupied by hydraulic linkup to another manifold, or for a variety of other reasons. Regardless the particulars, the presence of multiple low pressure valve locations 260-264, 270-274 at each station 230-234 adds to the sophisticated nature of the pairing between the pumps 140-149 and the manifold 160.

In spite of the potential complexity of the myriad of potential hydraulic hookups between the pumps 140-149 and the manifold stations 230-234, in the embodiments of FIGS. 1 and 2, each pump 140-149 is outfitted with a sensor. Specifically, as shown in FIG. 3B, detailed below, each pump 140-149 is outfitted with a sensor 340 which provides real-time information to the control unit 110. Specifically, fluid flow within each pump 140-149 may be tracked in combination with information regarding open and closed valves at each station 230-234 of the manifold. That is, as detailed further below, unique sequences of remote valve opening and closing in combination with fluid monitoring may be engaged in by the control unit 110 to attain and store pairing information. Of course, fluid flow may be measured a host of other ways from different locations including with combined readings, for example, from a flowmeter of the mixer 122 combined with a pressure transducer at each pump 140-149 (see FIG. 1).

Figure 3A:
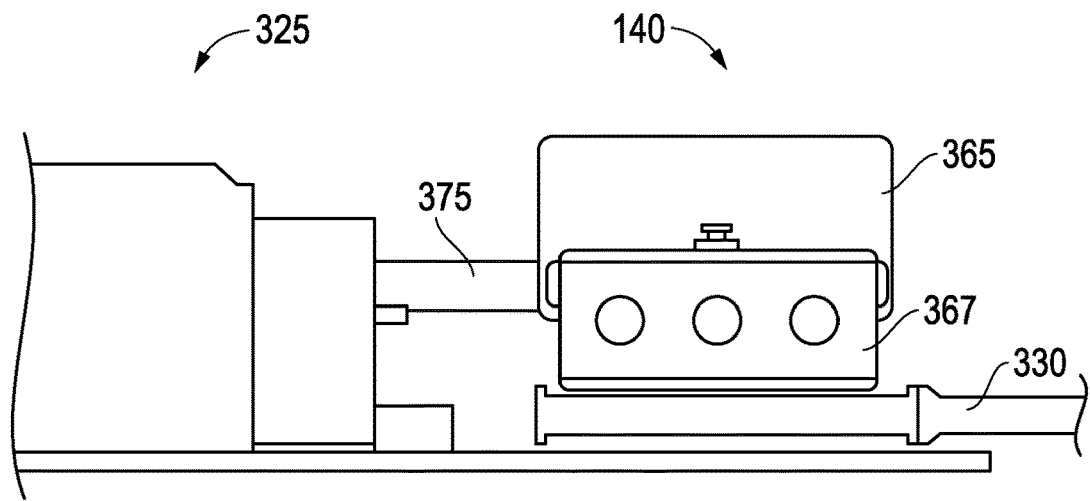
FIG. 3A is an enlarged side view of a pump of FIG. 1 for circulating a stimulation slurry from the manifold and back thereto at an increased pressure.
Figure 3B:
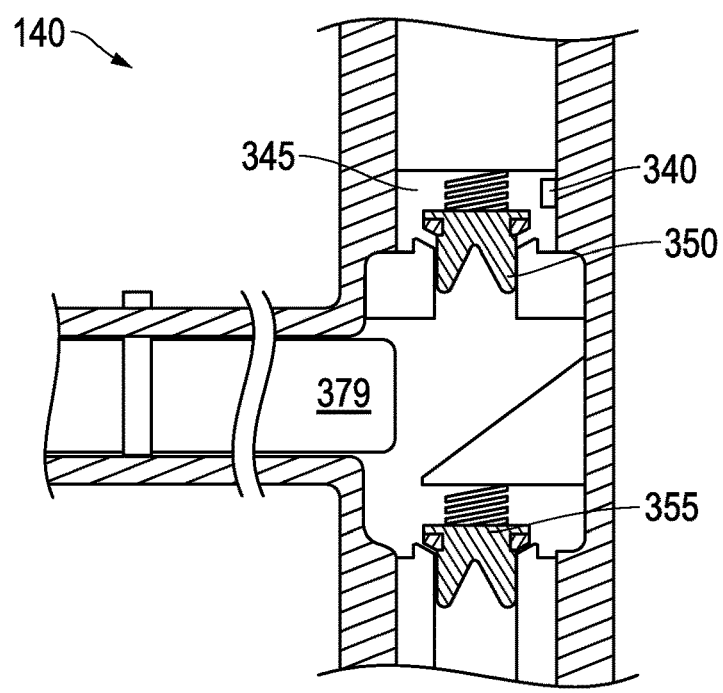
FIG. 3B is an enlarged cross-sectional view of a portion of the pump of FIG. 3A revealing a sensor therein for the pairing technique of FIG. 1.

Referring now to FIGS. 3A and 3B, with added reference to FIGS. 1 and 2, the operation of a pump 140 is described. Specifically, FIG. 3A depicts an enlarged side view of a pump 140 of FIG. 1. As detailed above, the pump 140 is configured for circulating a stimulation slurry from the manifold 160 and back thereto at an increased pressure. FIG. 3B is an enlarged cross-sectional view of a portion of the pump of FIG. 3A revealing the noted sensor 340 therein. As indicated above, this sensor 340, in combination with opening and closing of valve locations 260-264, 270-274, 280-284 may be utilized to carry out embodiments of pairing techniques.

Continuing with particular reference to FIG. 3A, the pump 140 is a positive displacement pump fully capable of generating sufficient pressure for a stimulation or fracturing application. For example, as noted above, the pump 140 may take a stimulation slurry from the manifold 160 at a pressure of less than about 100 PSI up to 7,500 PSI or more on route back to the manifold 160 for the application. This is achieved by routing the low pressure slurry to a fluid housing 367 of the pump 140 for pressurization. Specifically, an engine 325 of the pump 140 may power a driveline mechanism 375 to rotate a crankshaft 365 and effect the pressure increase in the adjacent fluid housing 367.

With additional reference to FIG. 3B, the pressure increase in the fluid housing 367 may translate to an increased flow rate detected by a sensor 340 during operation of the system. Specifically, as low pressure slurry moves past an intake valve 355 and into the housing 367 it is pressurized via a plunger 379 of the driveline mechanism 375. Thus, as the pressurized fluid moves past an outlet valve 350 and into the space 345 for return to the manifold 160, fluid flow may be detected by the noted sensor 340. As shown in the embodiments of FIGS. 3A and 3B, this space 345 is in communication with a discharge pipe 330 back to a high pressure valve location 280-284 of one of the stations 230-234 of the manifold 160. Thus, fluid flow detected from this space 345 via the sensor 340 may be interpreted by the control unit 110 of FIG. 1 in combination with valve information at the stations 230-234 to establish pairing as detailed below.

Figure 4A:
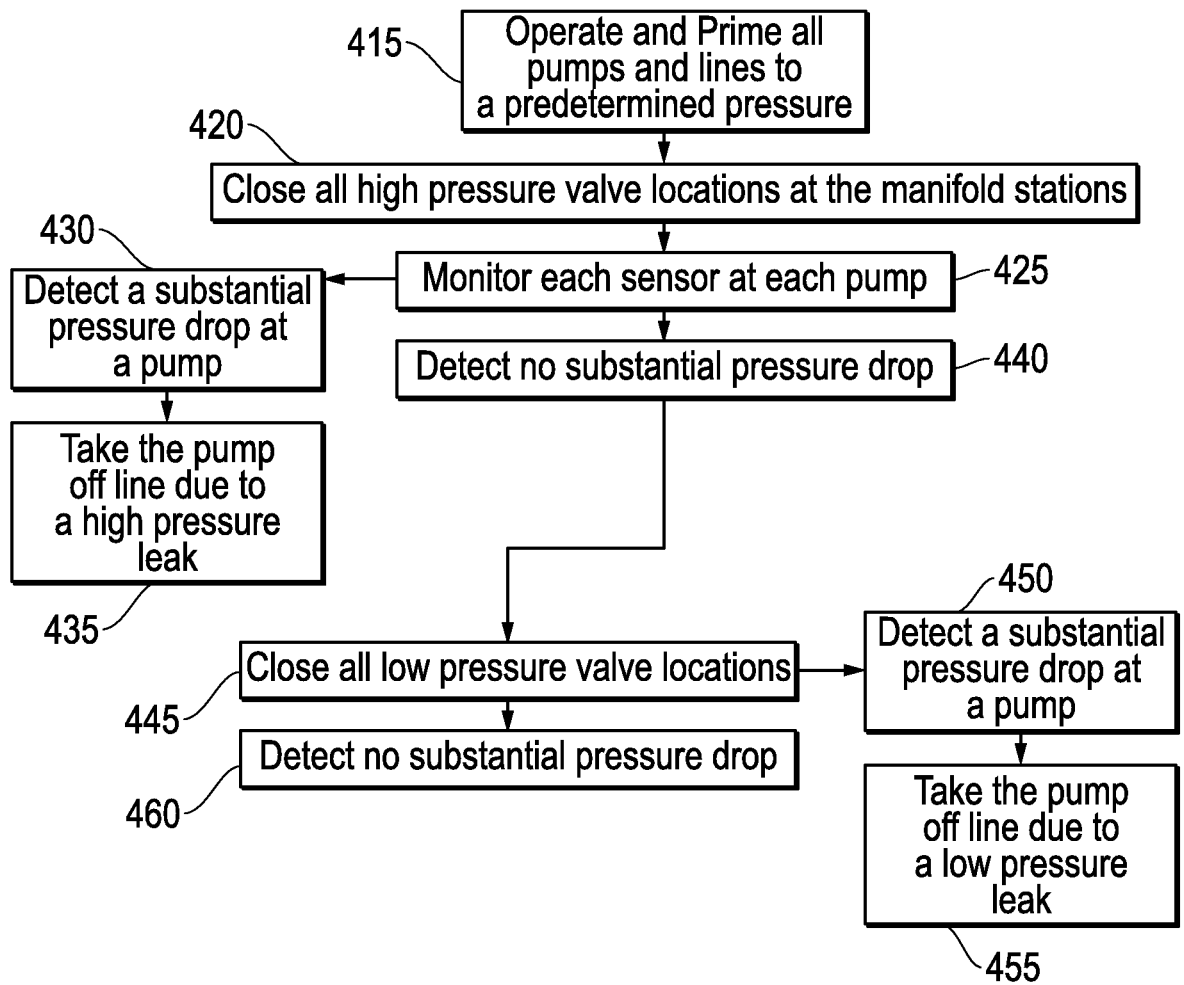
FIG. 4A is a flow-chart summarizing an embodiment of a leak-detection technique for pump evaluation and subsequent paring.
Figure 4B:
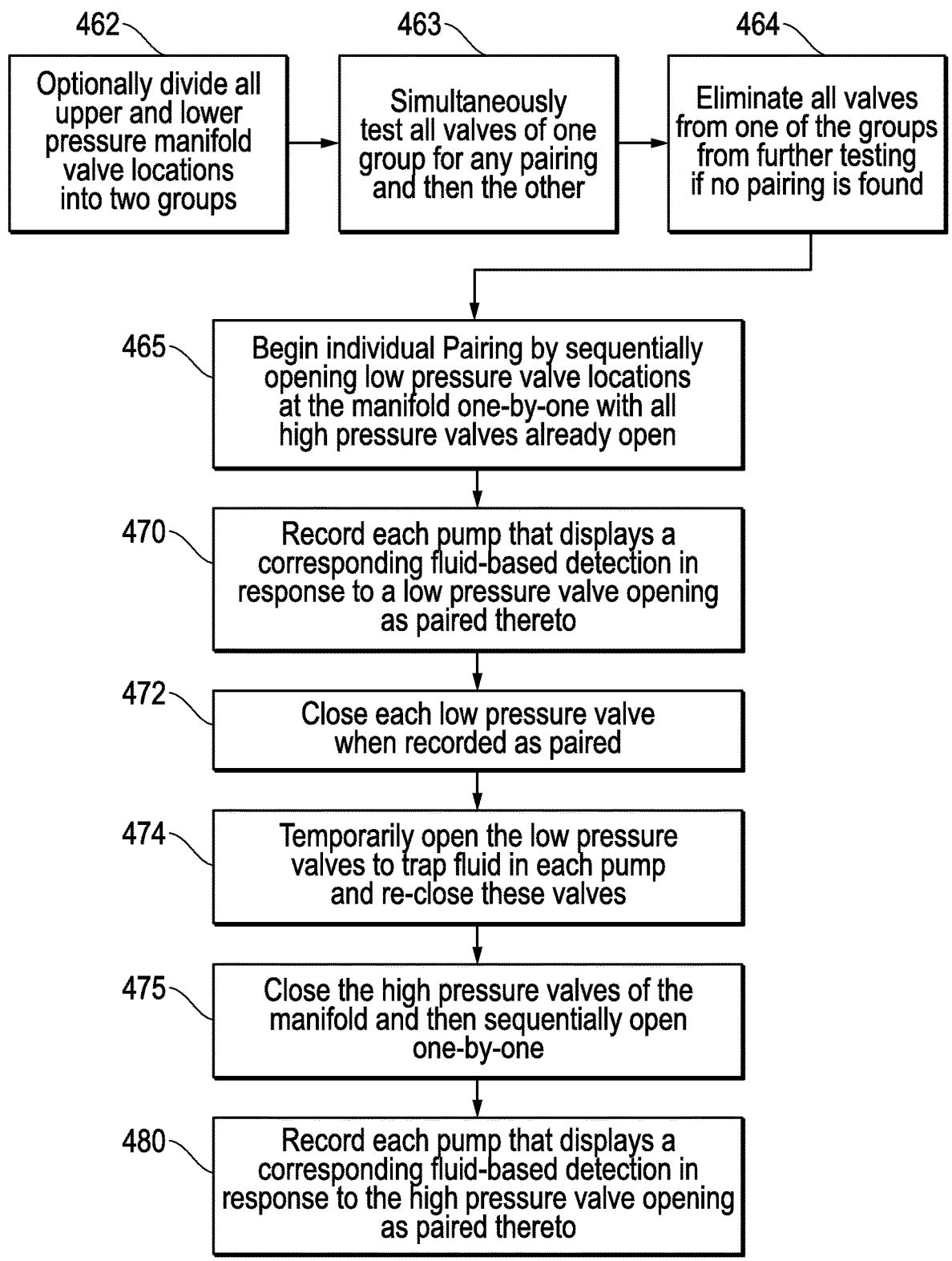
FIG. 4B is a flow-chart summarizing an embodiment of utilizing a paring technique to identify pump and valve location couplings for the system of FIG. 1.

Referring now to FIGS. 4A and 4B, with added reference to FIG. 1, flow-charts summarizing embodiments of leak detection and paring technique to identify pump and valve location couplings for the system of FIG. 1 are shown. As alluded to above, the techniques involve utilizing the control unit 110 to monitor the presence or absence of pump fluid flow while opening and closing valve locations at the manifold 160. Thus, it is not only possible to ensure that there are no leaks in the system 100 but indeed, checking for leaks may help to ensure proper pairing between each pumps 140-149 and the appropriate high pressure valve locations.

With specific reference to FIG. 4A, in order to begin both leak detection and pairing, the pumps 140-149 as well as the overall lines or linkages (e.g. 130-139) may be primed, though this may not be essential. In one embodiment, a circulating fluid flow corresponding to about 8-10 bpm at more than about 60 PSI may be seen in this regard. The high pressure valve locations may be closed at the manifold 160 as indicated at 420 with the sensor at each pump 140-149 being monitored by the control unit 110. In this way, if a substantial pressure drop is detected at one of the pumps 140-149 as indicated at 430, the pump 140-149 operations may be temporarily aborted to address the issue at the outset. However, for the pumps 140-149 where no substantial fluid flow is detected as noted at 440, the leak check may continue on the low pressure side of things. Specifically, as indicated at 445, all low pressure valve locations may be closed at the manifold 160. With all of the high pressure valve locations already closed as noted above, this means that the detection of a substantial fluid flow at any of the pumps 140-149 now is a result of a leak at the low pressure side. This may result in taking immediate remedial measures or in recording the leak and allowing continued flow therethrough as desired until a later time.

Referring specifically now to FIG. 4B, with added reference to FIG. 4A, with all pumps 140-149 and linkages 130-139 to the manifold 160 now considered "leak-free", pairing may now take place in a reliable manner. Specifically, for all remaining pumps 140-149 that did not display a substantial fluid flow as indicated at 460, pairing begins by opening all high pressure valves and then sequentially opening all low pressure valve locations one-by-one as indicated at 465. Thus, when a given pump displays a corresponding fluid flow in response to a low pressure valve opening as noted at 465, it may be recorded as paired thereto (see 470). Further, as each low pressure valve location is paired and recorded as such, they may be closed as indicated at 472 for sake of subsequent pairings. As indicated, in one embodiment, sensor detection may be configured to account for fluid flow as indicative of pairing. Though, other forms of fluid-based detections may also be utilized. Regardless, this process may proceed until each pump 140-149 is assigned or paired with a particular low pressure valve location at the manifold 160.

With all valves of the manifold 160 closed, the low pressure valves may be temporarily opened to trap fluid within each pump sufficient for subsequent detections (see 474). Specifically, the high pressure valve locations may now be opened sequentially, one-by-one as indicated at 475. Thus, each pump that displays a corresponding fluid-based detection from trapped fluid, in response to a high pressure valve opening may be recorded as paired thereto (see 480). Again, in this embodiment, the fluid-based detection may be one of fluid flow. However, other types of fluid detections are again possible. Regardless, all of the pairings between pumps 140-149 and the particular valve locations at the manifold 160 may now be complete.

Once pairing is complete, there may still be a desire to add additional pumps to the overall system 100 (see FIG. 1). While this pairing may not be as complex given that the pumps being added are likely comparatively fewer in number than those already in operation at the system 100, verifying pairing information for these pumps may still be valuable and relatively straight forward. For example, the high pressure and low pressure valve locations for all of the already known pairings of the other pumps may be closed off and removed from the pairing process. Then, as to the remaining unverified new pairings to be confirmed, the pairing process may begin anew as indicated at 465, by sequentially opening low pressure valve locations one-by-one (e.g. for the unverified low pressure valve locations only). The process may then continue as indicated at 470-480 as applied to the remaining unverified valve locations as well in order to complete the pairing process.

Of course, added levels of sophistication may also be brought to bear on the techniques detailed above. For example, as described above, the stations of the manifold 160 may be equipped with multiple low pressure valve locations 260-264, 270-274 as depicted at FIG. 2. Thus, as a time saving, optimization measure, the pairing that begins by sequentially opening the low pressure valve locations as indicated at 465 may be preceded by a step as shown at 462 that divides these valve locations into their respective groups (i.e. the upper low pressure valves 260-264 and the bottom low pressure valves 270-274). More specifically, before checking each low pressure valve location sequentially on an individual basis, the upper low pressure valves 260 may all simultaneously be opened by the control unit 110 of FIG. 1 (see 463). If, as is often the case, no fluid-based detection changes are induced at any of the pumps 140-149 because none of the upper low pressure valves 260-264 are actually being utilized by the pumps 140-149, then these valves may be closed and no sequential opening for sake of pairing need be undertaken (see 464). Instead, sequential opening of the bottom low pressure valves 270-274 may take place as indicated at 465 followed by recording the resultant pairing as indicated at 470.

The above described concept of dividing the low pressure valve locations 260-264, 270-274 into separate groupings for sake of time savings may be taken further, where more than one manifold 160 is utilized. For example, in many cases a manifold 160 as shown at FIGS. 1 and 2 may be linked to one or more additional manifolds in a daisy chain fashion. This is generally achieved by hydraulically linking a low pressure valve of one manifold to that of another. Regardless, in advance of paring by sequentially opening low pressure valve locations as indicated at 465, the low pressure valve locations 260-264, 270-274 of each manifold may be divided before pairing. Specifically, all of the upper low pressure valves 260-264 of one manifold may be simultaneously opened. If no fluid-based detection changes result at any of the pumps 140-149, these valves may be closed off with no further pairing steps applied thereto. Indeed, this same procedure may be repeated at each manifold before any pairing takes place. Thus, the operator may be able to effectively eliminate half of the low pressure valves from actually being checked for pairing. As a result, a considerable amount of time may be saved over the course of the pairing process.

Figure 5:
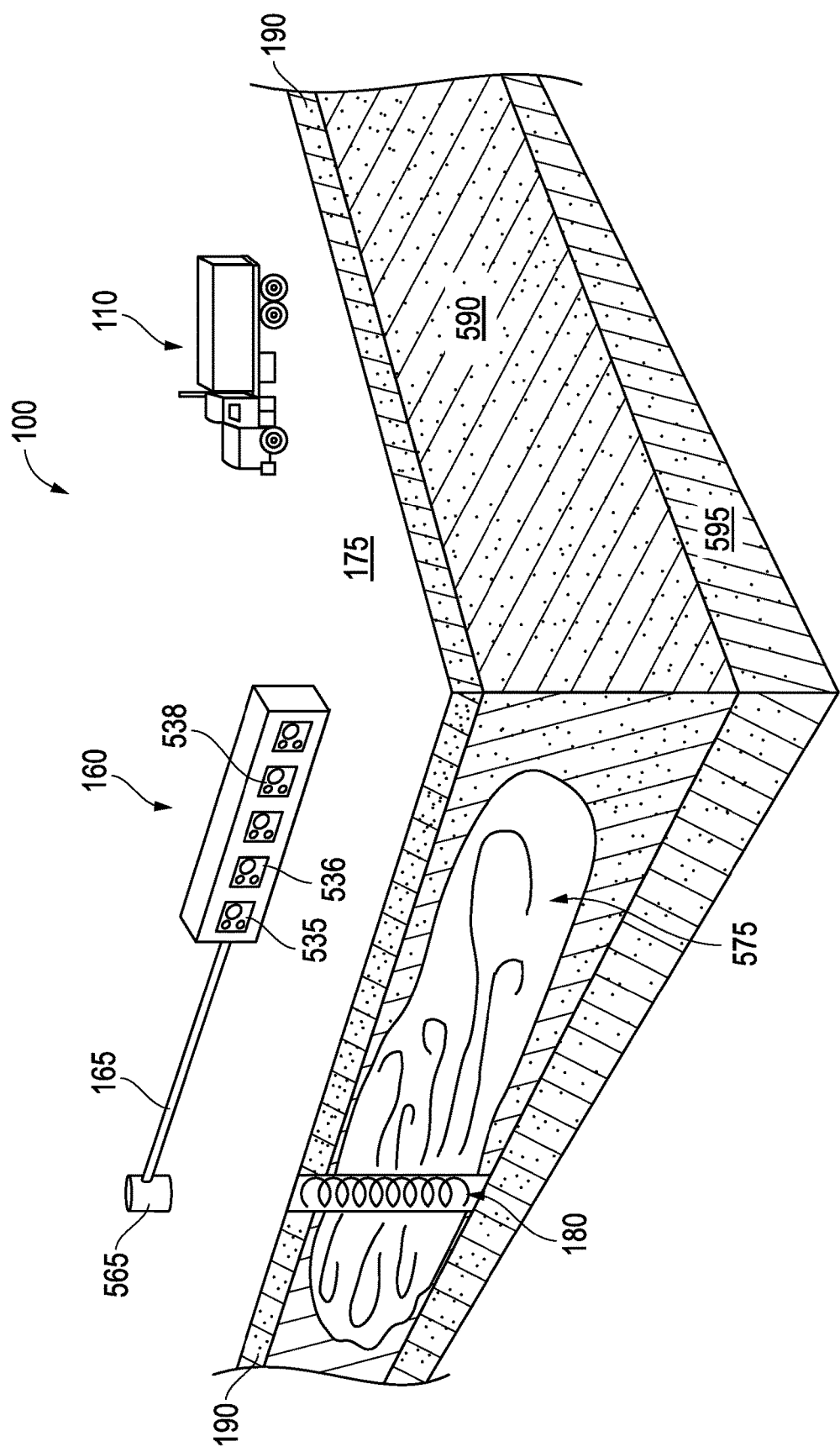
FIG. 5 is a schematic overview depiction of the system at the oilfield of FIG. 1 in operation after employing a pairing technique for a stimulation application.

Referring now to FIG. 5, a schematic overview depiction of the system 100 at the oilfield 175 of FIG. 1 is shown in operation after employing a pairing technique for a stimulation application. In this depiction, the other side of the manifold 160 is shown in contrast to the side visible in FIG. 2. Thus, the other stations 535-539 are apparent. Therefore, an additional five more pumps may be coupled to the manifold 160. In the embodiment shown, the pressurized slurry from the manifold 160 is directed over the line 165 running to the well 180. The well 180 traverses various formation layers 190, 590, 595. However, due to prior perforating or other well architecture, the application may be directed at a particular region 575 to encourage hydrocarbon production therefrom. Regardless, with a control unit 110 available for both remotely opening and closing all of the valves at the stations 535-539 (and 230-234 of FIG. 2) and correspondingly tracking pump fluid-flow detections, pairing may be achieved as depicted in FIG. 4B. As a result, a safe and efficient stimulation application may be run as depicted in FIG. 5.

Embodiments described above take more complete advantage of the possibility of remotely turning manifold valves off or on. Specifically, in addition to merely removing personnel from the immediate vicinity of hazardously pressurized manifolds in order to turn valves off or on, operators are substantially assured of which particular valves are to be properly turned off or on. So, for example, where a pump is to be put on or taken off line, operators are assured as to which particular valves of the manifold are to be correspondingly opened or closed. In this manner, hazards such as leaving a high pressure pump operating against an erroneously closed manifold valve may be avoided. This is achieved through use of the remote pairing techniques detailed herein.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, while a specifically located sensor is referenced herein for acquiring fluid flow readings, the sensor may be positioned in other locations or a different sensor type utilized. Specifically, a flow meter, water transducer, suction pressure sensor or different type of pressure sensor may be utilized. Furthermore, as a matter of practicality, while the pairing techniques detailed hereinabove may take place while pumps are in an idle state, this is not necessarily required. Along these lines, the foregoing description should not be read as pertaining only to the precise structures and techniques described and shown in the accompanying drawings, but rather should be read as consistent with and as support for the following claims, which are to have their fullest and fairest scope.

We claim:

1. A method of remotely pairing high pressure valves and low pressure valves at a manifold with pumps of a multi-pump system circulating a slurry at an oilfield, the method comprising:
   remotely opening all high pressure valves of the manifold;
   after opening all the high pressure valves, sequentially remotely opening low pressure valves at the manifold including:
   simultaneously opening a selected number of multiple low pressure valves at the manifold after closing all valves and before opening a given low pressure valve, the selected number of the multiple low pressure valves being fewer than a total of the low pressure valves at the manifold;
   confirming an absence of any responsive pressure increase in any pump of the multi-pump system; and
   upon confirming the absence of any responsive pressure increase in any pump of the multi-pump system, removing the selected number of the multiple low pressure valves from consideration as remaining low pressure valves for pairing, thereby reducing a time to remotely pair the valves of the multi-pump system;
   identifying a responsive fluid-based detection in a pump of the multi-pump system via at least one sensor located to monitor for a dedicated fluid flow to the pump upon opening the given low pressure valve, the dedicated fluid flow indicating fluid flowing directly from the given low pressure valve to the identified pump rather than to other pumps of the multi-pump system, thus establishing a pairing between the given low pressure valve and the identified pump;
   identifying responsive fluid-based detections at remaining pumps of the multi-pump system to identify individual pairings between the remaining low pressure valves and pumps; and
   recording the pairing between each of the identified pumps and the each of the given low pressure valves at a control unit at the oilfield, the pairing enabling each of the pumps to be individually and remotely connected to the multi-pump system by opening the paired valves and pumps, wherein the recorded pairing enables the control unit to close the appropriate paired valves when disconnecting a pump from the multi-pump system when the multi-pump system is operating, thereby maintaining operational integrity of the operating multi-pump system by enabling the multi-pump system to remain operational while the pump is being disconnected from the multi-pump system.

2. The method of claim 1 wherein maintaining comprises ensuring that a pump is not operating against an erroneously closed valve.

3. The method of claim 1 wherein the multiple low pressure valves are about half of the low pressure valves at the manifold.

4. The method of claim 3 wherein the manifold comprises stations each having a high pressure valve and two low pressure valves, the multiple low pressure valves comprising one of the two low pressure valves from each of the stations.

5. The method of claim 1 further comprising:
   closing all valves at the manifold;
   opening a selected one of the high pressure valves at the manifold;
   identifying a responsive fluid-based detection in a pump of the multi-pump system; and
   recording the identifying of the detection as a pairing between the pump and the selected opened high pressure valve at the control unit at the oilfield.

6. The method of claim 5 further comprising sequentially opening remaining high pressure valves at the manifold and identifying responsive fluid-based detections at remaining pumps of the multi-pump system to identify individual pairings between the remaining high pressure valves and pumps, the identified individual pairings between the high pressure valves and pumps recorded at the control unit.

7. The method of claim 6 further comprising performing an application in a well at the oilfield with the slurry.

8. The method of claim 7 wherein the application is one of a stimulation application and a fracturing application.

9. The method of claim 7 further comprising:
   employing the control unit to close identified high pressure and low pressure valves at the manifold; and
   taking a given pump of the multi-pump system off-line from the application, the given pump identified by the control unit as paired to the identified high pressure and low pressure valves.

10. The method of claim 7 further comprising:
    adding another pump to the multi-pump system for the application, the adding including hydraulically coupling the added pump to additional high pressure and low pressure valves at the manifold; and
    verifying pairing between the additional high pressure and low pressure valves at the manifold to the added pump, the verifying accounting for the identified individual pairings recorded at the control unit.

11. A multi-pump manifold system for circulating a slurry at an oilfield, the system comprising:
a manifold for obtaining a slurry;
a plurality of pumps hydraulically coupled to low pressure valves at the manifold for obtaining low pressure slurry therefrom, the pumps hydraulically coupled to high pressure valves at the manifold for returning high pressure slurry to the manifold;
a control unit coupled to the manifold for directing opening and closing of the high and low pressure valves thereat, the control unit communicatively coupled to each of the plurality of pumps for obtaining fluid-based information therefrom; and
a processor of the control unit for pairing each of the plurality of the pumps to individual high and low pressure valves at the manifold based on fluid-based information obtained from a plurality of sensors positioned to monitor whether fluid flow occurs during the opening and closing of the valves by the control unit, the pairing being determined upon receiving data from individual sensors of the plurality of sensors indicating a dedicated flow from a specific low pressure valve of the low pressure valves to a specific pump of the plurality of pumps rather than to other pumps of the plurality of pumps, thus establishing and recording a pairing between the specific low pressure valve and the specific pump, the pairing enabling each of the pumps to be remotely connected to the multi-pump manifold system by opening the appropriate recorded paired valves associated with the appropriate pumps, wherein the recorded pairing enables the control unit to close the appropriate paired valves when disconnecting a first pump from the multi-pump manifold system when the multi-pump manifold system is operating, thereby maintaining operational integrity of the operating multi-pump system by enabling the remaining pumps of multi-pump system to remain operational while the first pump is being disconnected from the multi-pump system; wherein monitoring whether fluid flow occurs during the opening and closing of the valves by the control unit comprises:
simultaneously opening a selected number of multiple low pressure valves after closing all valves and before opening the specific low pressure valve, the selected number of the multiple low pressure valves being fewer than a total of the low pressure;
confirming an absence of any responsive pressure increase in any pump of the multi-pump system; and
upon confirming the absence of any responsive pressure increase in any pump of the multi-pump system, removing the selected number of the multiple low pressure valves from consideration as remaining low pressure valves for pairing, thereby reducing a time to remotely pair the valves of the multi-pump system.

12. The system of claim 11 wherein the processor is further configured to determine leak information based on fluid flow information obtained during the opening and closing of the valves by the control unit.

13. The system of claim 11 further comprising one of a flowmeter, a water transducer and a suction pressure sensor disposed within each pump of the plurality to provide the fluid-based information.

14. The system of claim 11 wherein the manifold is a first manifold, the system further comprising a second manifold hydraulically coupled to the first manifold for obtaining low pressure slurry therefrom and hydraulically coupled to pumps of the plurality for circulating slurry therebetween.

15. The system of claim 11 further comprising a mixer to provide the slurry to the low pressure slurry to the manifold from water and proppant sources.

16. The system of claim 11 wherein the low pressure slurry is at a pressure less than about 300 PSI and the high pressure slurry is at a pressure greater than about 3,000 PSI.

* * * * *